(12) United States Patent
Müller et al.

(10) Patent No.: US 11,063,725 B2
(45) Date of Patent: Jul. 13, 2021

(54) ADAPTIVE MOBILITY REFERENCE SIGNAL CONFIGURATION

(71) Applicant: Telefonaktiebolaget LM Ericsson (publ), Stockholm (SE)

(72) Inventors: Walter Müller, Upplands Väsby (SE); Andres Reial, Malmö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 76 days.

(21) Appl. No.: 15/768,132

(22) PCT Filed: Feb. 12, 2018

(86) PCT No.: PCT/EP2018/053392
§ 371 (c)(1),
(2) Date: Apr. 13, 2018

(87) PCT Pub. No.: WO2018/146293
PCT Pub. Date: Aug. 16, 2018

(65) Prior Publication Data
US 2019/0260539 A1    Aug. 22, 2019

Related U.S. Application Data

(60) Provisional application No. 62/458,113, filed on Feb. 13, 2017.

(51) Int. Cl.
*H04L 5/00* (2006.01)
*H04W 76/11* (2018.01)
(Continued)

(52) U.S. Cl.
CPC .......... *H04L 5/0051* (2013.01); *H04L 5/0023* (2013.01); *H04L 27/2613* (2013.01);
(Continued)

(58) Field of Classification Search
CPC . H04L 5/0051; H04L 5/0023; H04L 27/2613; H04W 76/11; H04W 8/08; H04W 24/10; H04W 36/0061; H04W 72/046
See application file for complete search history.

(56) References Cited

U.S. PATENT DOCUMENTS

2008/0181194 A1    7/2008  Lindoff et al.
2011/0286423 A1   11/2011  Berggren et al.
(Continued)

FOREIGN PATENT DOCUMENTS

CN    101601194 A    12/2009
CN    102282899 A    12/2011
(Continued)

OTHER PUBLICATIONS

Ericsson, "Neighbor relation establishment in NR", Discussion, Decision, 3GPP TSG-RAN WG2 Nr Ad Hoc, Spokane, US, Jan. 17, 2017, pp. 1-4, Tdoc R2-1700548, 3GPP.
(Continued)

*Primary Examiner* — Donald L Mills
(74) *Attorney, Agent, or Firm* — Coats & Bennett, PLLC

(57) ABSTRACT

The invention relates to methods of configuring reference signal transmissions from one or more network nodes (12) to a wireless communication device (14) to facilitate mobility measurement reporting (MRS) by the wireless communication device. The methods comprise determining whether there is a need to include link set identifier content with one or more of the reference signal transmissions responsive to network information regarding a current mobility status of a network configuration, where each of said reference signal transmissions originate from one of the one or more network nodes (12). The method further comprises defining a configuration for each of the reference signal transmissions responsive to the determination, and configuring the one or more network nodes to implement the reference signal (Continued)

transmissions according to the defined configurations. The invention also relates to corresponding apparatus in one or more network nodes (12) and wireless communication devices (14) as well as computer programs.

26 Claims, 5 Drawing Sheets

(51) Int. Cl.
| | |
|---|---|
| *H04L 27/26* | (2006.01) |
| *H04W 8/08* | (2009.01) |
| *H04W 24/10* | (2009.01) |
| *H04W 36/00* | (2009.01) |
| *H04W 72/04* | (2009.01) |
| *H04B 7/06* | (2006.01) |

(52) U.S. Cl.
CPC .............. *H04W 8/08* (2013.01); *H04W 24/10* (2013.01); *H04W 36/0061* (2013.01); *H04W 72/046* (2013.01); *H04W 76/11* (2018.02); *H04B 7/0617* (2013.01); *H04L 27/2666* (2013.01)

(56) References Cited

U.S. PATENT DOCUMENTS

| | | | |
|---|---|---|---|
| 2012/0294184 A1 | 11/2012 | Jung et al. | |
| 2015/0358094 A1* | 12/2015 | Yi ........................ | H04B 17/318 370/252 |
| 2016/0249279 A1 | 8/2016 | Koorapaty et al. | |
| 2017/0171857 A1 | 6/2017 | Lee et al. | |
| 2018/0124766 A1* | 5/2018 | Nagaraja ............... | H04B 7/0695 |
| 2018/0192347 A1* | 7/2018 | Shaheen ................ | H04W 36/36 |
| 2018/0192438 A1* | 7/2018 | John Wilson ........ | H04B 7/0695 |
| 2018/0198585 A1* | 7/2018 | Lin ........................ | H04L 5/0048 |
| 2018/0205469 A1* | 7/2018 | Nagaraja ............... | H04B 7/0617 |
| 2018/0220344 A1* | 8/2018 | Shaheen ................ | H04W 4/60 |
| 2018/0287677 A1* | 10/2018 | Nagaraja ................ | H04B 7/08 |
| 2018/0288604 A1* | 10/2018 | Ly ........................... | H04L 43/16 |
| 2019/0281488 A1* | 9/2019 | Xiong ................... | H04W 16/02 |

FOREIGN PATENT DOCUMENTS

| | | |
|---|---|---|
| WO | 2009123391 A1 | 10/2009 |
| WO | 2011090328 A2 | 7/2011 |
| WO | 2016095984 A1 | 6/2016 |
| WO | 2016153253 A1 | 9/2016 |
| WO | 2018087735 A1 | 5/2018 |

OTHER PUBLICATIONS

Ericsson, "RS for beam management", Discussion and Decision, 3GPP TSG-RAN WG1 #87, Reno, Nevada, Nov. 14, 2016, server date Nov. 13, 2016, pp. 1-4, R1-1612346, 3GPP.

Ericsson, "Configuration of beam-specific mobility RS in RRC_Connected", Discussion, 3GPP TSG-RAN WG2 NC Ad Hoc, Spokane, US, Jan. 17, 2017, pp. 1-5, Tdoc R2-1700540, 3GPP.

Ericsson, "On NR DL mobility measurement signal design", Discussion, Decision, 3GPP TSG-RAN WG1 Meeting 187, Reno, NV, US, Nov. 14, 2016, pp. 1-4, R1-1611915, 3GPP.

Ericsson, "Enabling beam grouping by UE in mobility RS measurements", 3GPP TSG-RAN WG1 Meeting #87, Reno, NV, US, Nov. 14, 2016, pp. 1-8, R1-1611916, 3GPP.

Chen, Q., "Survey of Mobility Management of Heterogeneous Small Cell Networks", Key Laboratory of Mobile Communications Technology, Chongqing University of Posts and Telecommunications, vol. 28, No. 5, Jan. 10, 2016, pp. 601-612, P.R. China.

Search Report for CN 201880011741.6, dated Apr. 13, 2021, pp. 1-3, China National Intellectual Property Administration.

\* cited by examiner

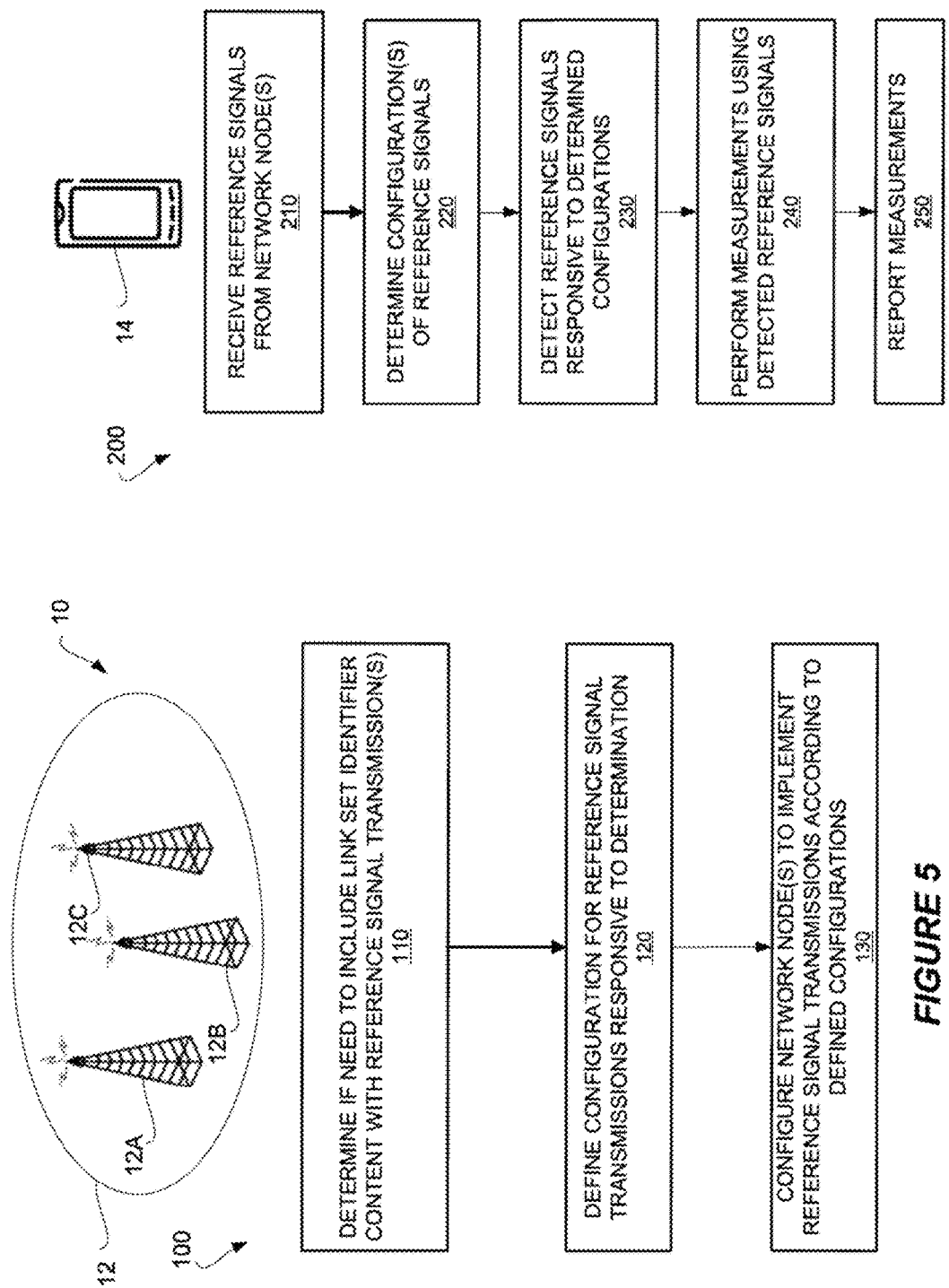

ADAPTIVE MOBILITY REFERENCE SIGNAL CONFIGURATION

BACKGROUND

Mobility management in wireless communications generally relies on the monitoring of a wireless communication device as it moves through the network, and managing handover of that device between beams, nodes, and/or cells to provide the best service to the device. Such mobility management often relies on measurements, made by the wireless communication device, regarding the quality of the signals received by the device from various network nodes. To that end, each network node transmits one or more reference signals (RSs) to the device, where the wireless communication device uses these signals to perform various measurements that are subsequently reported back to the network node(s). For example, each network node may transmit a RS for each beam used to transmit signals, where the wireless communication device reports one or more measurements made for each received RS to its serving network node. The serving node then makes mobility management decisions, e.g., when to handover the wireless communication device, in response the received measurement reports.

As long as the serving network node can accurately associate each received measurement report with the correct beam, network node, and cell, the serving network node can use the received measurement reports to manage the device's mobility. However, the more identification information included with each RS, the more overhead/load required for each RS transmission. As such, there is a desire to minimize the amount of identification information included with each RS without negatively impacting the serving node's ability to accurately perform mobility management.

Active Mode Mobility

In active mode, the connection of a moving wireless communication device (UE, user equipment) must be seamlessly handed over as the UE moves across the different cell coverage areas in the network. Handover is the process of transferring an ongoing connection of a UE from one node (the serving) to another node (the target), or from one cell to another within the same node. This is done to accomplish a transparent service or service continuity over a larger area. The handover should happen without any loss of data and preferably with no interruption.

In legacy cell-based systems like Long Term Evolution (LTE), the so-called cell-specific reference signals (CRSs) are used for mobility measurements. These are broadcasted in all neighbor cells in an always-on manner over the entire bandwidth, regardless of the presence or position of UEs in the system. The CRS are easy to measure and yield consistent results, but static CRS signaling leads to high resource usage, power consumption and constant inter-cell interference generation in the downlink. All base stations continuously transmit pilot signals that UEs in own and neighbor cells use to estimate the target cell quality. This is also true in Global System for Mobile communications (GSM) (Broadcast Control Channel (BCCH)), Wideband Code Division Multiple Access (WCDMA) (Common Pilot Channel (CPICH)) and in Wi-Fi (beacon). Each UE performs periodic measurements and reports the measurement results to the network when certain reporting conditions are met (periodic or event based). If it is detected that the serving cell quality is getting close to another candidate cell power, a more detailed measurement process or a handover procedure may be initiated.

In modem beam based systems, the serving and target node identities are no longer sufficient for maintaining seamless connections during inter-node handover. Handover management between narrow beams in neighboring base stations becomes a necessity, and the serving base station also needs to decide if a beam switch or beam update is necessary within the own cell. The serving link may thus effectively be the beam through which the base station is currently communicating with the UE, and the beam to which it will hand over or switch becomes the target link. See FIG. 1 described below.

Mobility Measurement Reference Signals

In a beam-based system like 5G New Radio (NR), it is desired to avoid excessive static Downlink (DL) RS signaling, so instead the NW may turn on mobility reference signals (MRSs) only when UEs are present in a given area of the network. Candidate MRS may also be activated in a UE-specific manner only in relevant candidate beams when the NW determines that a beam update for the UE may be needed, e.g., when decreasing serving beam quality is detected. Each activated beam then transmits a beam-specific MRS that carries the beam ID info, as shown in FIG. 1. As shown in the exemplary network 10 of FIG. 1, a network node 12A transmits beams with different MRS, MRS-1, MRS-2 and MRS-3. Another network node 12B transmits beams with different MRS, MRS-4 and MRS-5. A further network node 12C transmits beams with different MRS, MRS-6 and MRS-7. A UE 14 is currently located to receive the beams with MRS-2, MRS-4 and MRS-7 as the "best" beam from the respective network nodes 12A, 12B and 12C. (As understood from above, the term "beam" may in some deployments be equivalent to sectors, cells, node coverage area, etc.) In some designs, the MRS also includes a timing synchronization component to obviate the need for acquiring a separate synch signal, e.g. the Primary Synchronization Signal/Secondary Synchronization Signal (PSS/SSS), that may have different coverage properties and lower received power.

In such a system, various MRS measurement and reporting strategies may be employed. In an LTE-like setup, the UE may be continuously monitoring the received sample stream for the presence of MRS. When some event criterion is fulfilled, e.g. any MRS is detected with signal quality exceeding a threshold, the UE would report the received MRS ID and signal quality to the network. The reports would be used for mobility decisions and for building an ANR database at node/cell or beam resolution level. In an alternative, 5G-style setup, the NW triggers MRS measurements by transmitting a measurement command via control signaling, e.g. when degrading serving link quality or another reason for initiating mobility measurements is identified. The measurement command may contain reporting instructions and, in some embodiments, an explicit list of MRS to measure. The serving and/or other candidate ANs reserve UL resources for receiving measurement reports in the UL.

The MRS allocation needs to ensure that different beams sharing MRS indices from a common pool are uniquely identified. This is done e.g. by randomly assigning MRSs from a large enough pool so that the collision probability is low enough, by detecting collisions and changing the respective assignments to resolve them, or alternatively by previously negotiating the allocations between multiple nodes and signaling explicit individual assignments. In general, principles used for PCI conflict resolution in LTE networks can be used for MRS conflict handling as well. The set of nodes/cells sharing a given pool of MRS indices is selected so that (1) the number of unique beams to be simultaneously identified is small enough in relation to the MRS address space and the conflict probability is kept below a desired threshold, and (2) the probability of a UE detecting a MRS from outside a coordinated set of nodes/cells is below a desired threshold.

One possible MRS design conveying the beam ED is described in the 3GPP Discussion Document R1-1611915 "On NR DL Mobility Measurement Signal Design" and "Active Mobility Signal Configuration".

Beam/Cell Relationships

In general, if the MRS allocation is achieved according to the criteria above, it is not necessary for the UE to associate a received MRS with its originating cell. The UE can report the detected MRS ID to the serving node which possesses a mapping of which cell a given MRS ID corresponds to. However, in some situations, a UE may prefer to be able to distinguish between MRSs originating from the same (serving) cell and other cells. This may e.g. help determine which MRSs to group for cell-level measurements and reporting, to evaluate best MRS amongst the MRS that belongs to the same cell, or to use the same evaluation control parameters for the group, like not resetting the Time to Trigger (TTT) counter while detecting several different best beams tinning a measurement procedure that originate from the same cell.

One approach to provide beam grouping information without requiring explicit coordination is to include originating cell ID information, e.g. the Physical Cell identifier (PCI), in MRS transmission. That identifier is unique per cell and provides both beam grouping and cell identification functionality, albeit at the cost of more network capacity expended for mobility measurement signals and reporting. Examples of such MRS formats are provided in the 3GPP Discussion Document R1-1611916 "Enabling Beam Grouping by UE in Mobility RS Measurements".

ANR

In order for the above active mode mobility solution to work, the serving node needs to know the identity of the neighboring base stations transmitting the MRSs. A list of previously identified neighbors is typically stored in the neighbor list of each node. If a UE reports an away (non-serving node) MRS then the serving node needs to know which neighboring node is transmitting the MRS. The ANR system should guarantee a sufficiently low probability of MRS conflicts and instances of unknown MRS reports. For this, it relies on mobility measurement (MRS) reports.

One definition of "unknown" may be, depending on the MRS format, that the beam IDs of the received and reported MRS is not coordinated with the serving cell, or that the serving cell does not recognize the associated cell ID. This may be the case when a UE in a home cell SS1 may hear a beamformed MRS from a "far-away" cell SS3, as shown in FIG. 2. In this example, Cell SS1 neighbor list contains cell SS2 but not cell SS3 and the away $MRS_m$ is not coordinated/recognized.

If a UE reports an unknown away MRS then the automatic neighbor relation (ANR) algorithm is supposed to identify the source of the MRS and set up a neighbor relation. In LTE this is done by requesting the UE to read the cell global identity (CGI) associated with the measurement and report this global identity to the serving node. The serving node then contacts a server in the network and receives the IP-address of the node with said CGI and initiates a neighbor relation setup procedure.

Network Reconfiguration

While the network deployment often remains unchanged for long periods of time, occasionally new nodes are added or node antenna configurations may be reconfigured so that the neighbor lists become outdated. In particular, a new node added into the network must preferably automatically bootstrap a process by which new network node information is propagated to existing nodes' ANR tables so that the new node will be fully integrated into the overall ANR framework) to be recognized by its neighbors; manual modification of neighbor lists should be avoided. In LTE, the "golden PCI" approach is often used where the new node is temporarily assigned a unique PCI that is guaranteed to be unknown to other nodes. When neighbor nodes then detect that PCI, an automatic identification request and ANR update is triggered. In general, it is desired that a mobility measurement solution chosen for the next generation radio access technology should support automatic ANR updates, although not necessarily using the golden sequence approach.

Problems with Existing Solutions

Low-overhead MRS that only carry the beam ID design facilitates lean design and maximizes NW capacity. However, the lack of originating cell ID information can lead to various complications:

Unless the UE is separately informed, it cannot group the received MRS originating from the same cell/Transmission/Reception Point (TRP) to optimize mobility measurement reporting Due to the limited address space of MRS and the reliance on explicit MRS allocation and coordination within a limited area, the ANR function likely experiences frequent beam ID conflicts and unrecognized transmissions due to beams from outside the local coordination area.

When adding new nodes, the new node's MRS are not coordinated and recognized by neighbor cells. This may require manual additional of the new node to the neighbor lists of nearby nodes.

One alternative mentioned is to use the traditional mobility RS principles where all mobility signals also carry originating cell ID information, like CRS and PSS/SSS in LTE. However, to support beam based-system with potentially dense node deployments, both the node and beam address spaces must be large. The aggregate overhead of such a design is high and significantly affects the data capacity of the network.

There is thus a need for an active mode mobility RS design that does not load the MRS signaling unnecessarily but can nevertheless support basic mobility measurement and additional reporting, ANR, and NW reconfiguration functions.

SUMMARY

The active mode mobility RS (MRS) configuration in the network (NW), or in a part of it, is dynamically adapted to provide the currently required extent of link set identifier content in response to instantaneous mobility, Automatic Neighbor Relation (ANR), and/or NW reconfiguration requirements. RS transmissions generally include some minimum amount of identification information, e.g., a beam identifier. The solution presented herein dynamically determines when/how often to include link set identifier content with the RS in addition to the beam identifier. Thus, as used herein, link set identifier content refers to any identification information for the source of the corresponding RS that is in addition to the minimum required information (e.g., the beam identification information), and thus that further identifies the source of the RS beyond the beam identifier. Exemplary link set identifier content includes, but is not limited to, local cell ID information, global cell ID information, sector ID information etc. It will be appreciated that link set identifier content is not limited to a fixed length or address space. As such, the solution presented herein not only encompasses the adaptation of the RS transmission configuration to include/exclude link set identifier content, but also encompasses the adjustment of the signaling load by adjusting properties, e.g., length and/or address space, associated with the link set identifier content included with the RS. It will be appreciated that the solution presented herein is not limited to any specific format of MRSs, but also applies to any reference signals used for mobility management.

In one embodiment, the MRS is configured to select one of predetermined distinct formats. In another, a continuously or gradually adjustable signal format is configured to provide the instantaneously required extent of the link set identifier content.

The MRS solution of embodiments of the solution presented herein combines average low signaling load for mobility measurements with the ability to provide cell ID information in situations when it is required to support, e.g., ANR functions. The method thus provides robust mobility and NW reconfiguration support, improving user experience and handover (HO)-related Key Performance Indicators (KPIs). It also minimizes the overhead of mobility-related RS and the associated data capacity penalty.

Embodiments of the solution presented herein may strike a balance between wanted functions and required overhead in the reference signaling in a dynamic manner.

One embodiment comprises a method in a network node of configuring reference signal transmissions from one or more network nodes to a wireless communication device to facilitate mobility measurement reporting by the wireless communication device. The method comprises determining whether there is a need to include link set identifier content with one or more of the reference signal transmissions responsive to network information regarding a current mobility status of a network configuration, where each of said reference signal transmissions originate flora one of the one or more network nodes. The method further comprises defining a configuration for each of the reference signal transmissions responsive to the determination, and configuring the one or more network nodes to implement the reference signal transmissions according to the defined configurations.

Further embodiments of the network node method comprises features of the network node set forth below.

One embodiment comprises one or more nodes in a wireless communication network adapted to configure reference signal transmissions to a wireless communication device to facilitate mobility measurement reporting by the wireless communication device. The one or more network nodes comprise an evaluation circuit, a selection circuit, and a configuration circuit. The evaluation circuit is adapted to determine whether there is a need to include link set identifier content with one or more reference signal transmissions responsive to network information regarding a current mobility status of a network configuration, where each of said reference signal transmissions originate flora one of the one or more network nodes. The selection circuit is adapted to define a configuration for each of the reference signal transmissions responsive to the determination. The configuration circuit is adapted to configure the one or more network nodes to implement the reference signal transmissions according to the defined configurations.

Such a node may include an aggregation point comprising the evaluation, selection, and configuration circuits; and the configuration circuit configures the one or more network nodes by providing the corresponding configuration(s) to each of the one or more network nodes.

The aggregation point may further comprise a receiver adapted to receive the network information from at least one of the remaining one or more network nodes, and wherein the evaluation circuit determines whether there is a need to include link set identifier content responsive to the received network information.

In an embodiment, the selection circuit is adapted to define the configuration by selecting one of a plurality of formats for each of the reference signal transmissions responsive to the determination.

Suitably, the plurality of formats comprise a first format and a second format, wherein said first format does not include any link set identifier content with the reference signal transmission, and wherein a second format includes a first link set identifier content with the reference signal transmission.

In an embodiment, the plurality of formats further comprises a third format including a second link set identifier content that is different from or in addition to the first link set identifier content of the second format.

In an embodiment, the selection circuit is adapted to select one of the plurality of formats by switching from the first format to the second format responsive to determining there is a need to include the link set identifier content with one or more of the reference signal transmissions.

In an embodiment, the selection circuit is adapted to select one of the plurality of formats by switching from the second format to the first format responsive to determining there is not a need to include the link set identifier content with one or more of the reference signal transmissions.

In an embodiment, the selection circuit is adapted to define the configuration by defining, for each reference signal transmission, a period controlling how often to include the link set identifier content with the corresponding reference signal transmission responsive to the determination.

The period may comprise a value N such that the link set identifier content is included with every $N^{th}$ subframe of the corresponding reference signal transmission.

The period may comprise a first value N and a different second value M, wherein a first type of the link set identifier content is included every $N^{th}$ subframe of the corresponding reference signal transmission, and a second type of the link set identifier content is included every $M^{th}$ subframe of the corresponding reference signal transmission.

In an embodiment, the selection circuit is adapted to define the configuration by changing the period responsive to network information indicating one or more changes to a status of the network configuration.

In an embodiment, the selection circuit is adapted to change the period by increasing the period responsive to network information indicating an increase in changes to a status of the network configuration.

In an embodiment, the selection circuit is adapted to change the period by decreasing the period responsive to network information indicating a decrease in changes to a status of the network configuration.

The link set identifier content may comprise at least one of a local cell ID information and a global cell ID information.

In an embodiment, the configuration circuit is further adapted to configure the one or more network nodes to inform the wireless device of the defined configurations.

The network information regarding the current mobility status of the network configuration may comprise at least one of a mobility status of the wireless communication device, an automatic neighbor relation status, and a network reconfiguration status.

In an embodiment, the selection circuit is further adapted to select, for at least one of the one or more network nodes, a controlling configuration from the configurations defined for the reference signal transmissions associated with the corresponding network node, Wherein the selection circuit is adapted to configure the one or more network nodes by configuring each network node according to the selected controlling configuration to implement each reference signal transmission associated with the corresponding network node according to the controlling configuration.

In an embodiment, the selection circuit is adapted to select the controlling configuration by identifying which of the configurations defined for the reference signal transmissions is present more the other configurations, and selecting this configuration as the controlling configuration.

In an embodiment, the selection circuit is adapted to select the controlling configuration by selecting the configuration that includes link set identifier content as the controlling configuration when it is determined that any of the reference signal transmissions for a particular node needs to include the link set identifier content.

In an embodiment, the configuration circuit is adapted to configuring the one or more network nodes by configuring each of the one or more network nodes to implement each corresponding reference signal transmission according to the configuration defined for the corresponding reference signal transmission.

The reference signal transmission may comprise a mobility reference signal transmission.

In an embodiment, the evaluation circuit is adapted to determine whether there is a need to include the link set identifier content by: determining if a new network node has been added; if a new network node has been added, determining there is a need to include the link set identifier content with at least part of the one or more of the reference signal transmissions; and else, determining there is not a need to include the link set identifier content with one or more of the reference signal transmissions.

In an embodiment, the evaluation circuit is adapted to determine whether there is a need to include link set identifier content by: counting a number of reference signal problems associated with the status of the network configuration; comparing the number of reference signal problems to a reference threshold; if the number of reference signal problems exceeds the reference threshold, determining there is a need to include the link set identifier content with at least part of the one or more of the reference signal transmissions; and else determining there is not a need to include the link set identifier content with one or more of the reference signal transmissions.

In an embodiment, the evaluation circuit is adapted to count the number of reference signal problems by counting at least one of a number of reference signal conflicts and a number of unknown reference signals.

In an embodiment, the evaluation circuit is further adapted to: count a number of network mobility problems associated with the status of the network configuration; compare the number of network problems to a network threshold; if the number of network problems exceeds the network threshold, determine there is a need to include additional link set identifier content with at least part of the one or more of the reference signal transmissions; and else, determine there is not a need to include the additional link set identifier content with one or more of the reference signal transmissions.

In an embodiment, the evaluation circuit is adapted to determine whether there is a need to include link set identifier content by: counting a number of neighbor list updates associated with the status of the network configuration; comparing the number of neighbor list updates to a list threshold; if the number of neighbor list updates exceeds the list threshold, determining there is a need to include the link set identifier content with at least part of the one or more of the reference signal transmissions; and else, determining there is not a need to include the link set identifier content with one or more of the reference signal transmissions.

In an embodiment, the evaluation circuit is adapted to determine whether there is a need to include link set identifier content by: periodically reviewing an automatic neighbor relation status associated with the status of the network configuration to determine if there are any changes to the automatic neighbor relation status; if there are changes to the automatic neighbor relation status, determining there is a need to include the link set identifier content with at least part of the one or more of the reference signal transmissions; and else, determining there is not a need to include the link set identifier content with one or more of the reference signal transmissions.

One embodiment comprises a method of processing reference signals in a wireless communication device. The method comprises receiving a plurality of reference signals from one or more network nodes at the wireless communication device, and determining one or more configurations of the received reference signals. Each of said configurations defines whether link set identifier content is included with the received reference signals. The method further comprises detecting the received reference signals responsive to the determined one or more configurations, performing one or more measurements for each of the received reference signals using the corresponding detected reference signals, and reporting the one or more measurements from the wireless communication device to a network node serving the wireless communication device.

Further embodiments of the wireless communication device method comprises features of the wireless communication device set forth below.

One embodiment comprises a wireless communication device adapted to process reference signals. The wireless communication device comprises a receiver, a configuration circuit, a detection circuit, a measurement circuit, and a transmitter. The receiver is adapted to receive a plurality of reference signals from one or more network nodes at the wireless communication device. The configuration circuit is adapted to determine one or more configurations of the received reference signals, where each of said configurations defining whether link set identifier content is included with the received reference signals. The detection circuit is adapted to detect the received reference signals responsive to the determined one or more configurations. The measurement circuit is adapted to perform one or more measurements for each of the received reference signals using the corresponding detected reference signals. The transmitter is adapted to report the one or more measurements to a network node serving the wireless communication device.

In an embodiment, the configuration circuit is adapted to determine the configuration of the received reference signals by blindly determining the configuration of the received reference signals by: evaluating one or more predetermined locations within each of the reference signals to determine whether link set identifier content is present in one or more of the received reference signals; and determining the configuration for each received reference signal responsive to the evaluation.

In an embodiment, the configuration circuit is further adapted configure the wireless communication device according to one or more predetermined configurations defined for the reference signals, wherein the configuration circuit is adapted to determine the configuration of the received reference signals by determining which of the one or more predetermined configurations applies to each received reference signal.

In an embodiment, the transmitter is adapted to report the one or more measurements by reporting the one or more measurements according to a predetermining signaling configuration.

In an embodiment, the transmitter is adapted to report the one or more measurements by reporting each of the one or more measurements according to the configuration of the corresponding received reference signal.

In an embodiment, the transmitter is adapted to report the one or more measurements by reporting each measurement with any link set identifier content included in the corresponding received reference signal.

In an embodiment, the configuration circuit is adapted to determine one or more configurations by determining the configuration of each of the received reference signals, and wherein the detection circuit is adapted to detect the received reference signals by detecting each received reference signal responsive to the corresponding determined configuration.

One embodiment comprises a computer program comprising instructions which, when run on one or more processing circuits in a network node, causes the node to carry out a method of configuring reference signal transmissions from one or more network nodes to a wireless communication device to facilitate mobility measurement reporting by the wireless communication device. The instructions, when run on the one or more processing circuits cause the node to determine whether there is a need to include link set identifier content with one or more of the reference signal transmissions responsive to network information regarding a current mobility status of a network configuration, where each of said reference signal transmissions originate from one of the one or more network nodes. The instructions, when run on the one or more processing circuits further cause the one or more nodes to define a configuration for each of the reference signal transmissions responsive to the determination, and configure the one or more network nodes to implement the reference signal transmissions according to the defined configurations.

One embodiment comprises a computer program comprising instructions which, when run on one or more processing circuits in a wireless communication device, causes the wireless communication device to carry out a method of processing reference signals in the wireless communication device. The instructions, when run on the one or more processing circuits cause the wireless communication device to receive a plurality of reference signals from one or more network nodes at the wireless communication device, and determine one or more configurations of the received reference signals. Each of said configurations defines whether link set identifier content is included with the received reference signals. The instructions, when run on the one or more processing circuits further cause the wireless communication device to detect the received reference signals responsive to the determined one or more configurations, perform one or more measurements for each of the received reference signals using the corresponding detected reference signals, and report the one or more measurements from the wireless communication device to a network node serving the wireless communication device.

Embodiments also comprise carriers containing the computer programs above, wherein the carrier is one of an electronic signal, optical signal, radio signal, or computer readable storage medium.

The MRS solution of embodiments of the solution presented herein combines average low signaling load for mobility measurements with the ability to provide cell ID information in situations when it is required to support e.g. ANR functions. The method thus provides robust mobility and NW reconfiguration support, improving user experience and HO-related KPIs. It simultaneously minimizes the overhead of mobility-related RS and the associated data capacity penalty.

Embodiments of the solution presented herein may strike a balance between wanted functions and required overhead in the reference signaling in a dynamic manner.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

FIG. 5 is a flowchart illustrating example method steps of a network node according to some embodiments;

FIG. 6 is a flowchart illustrating example method steps of a wireless communication device according to some embodiments;

DETAILED DESCRIPTION

Figure 1:
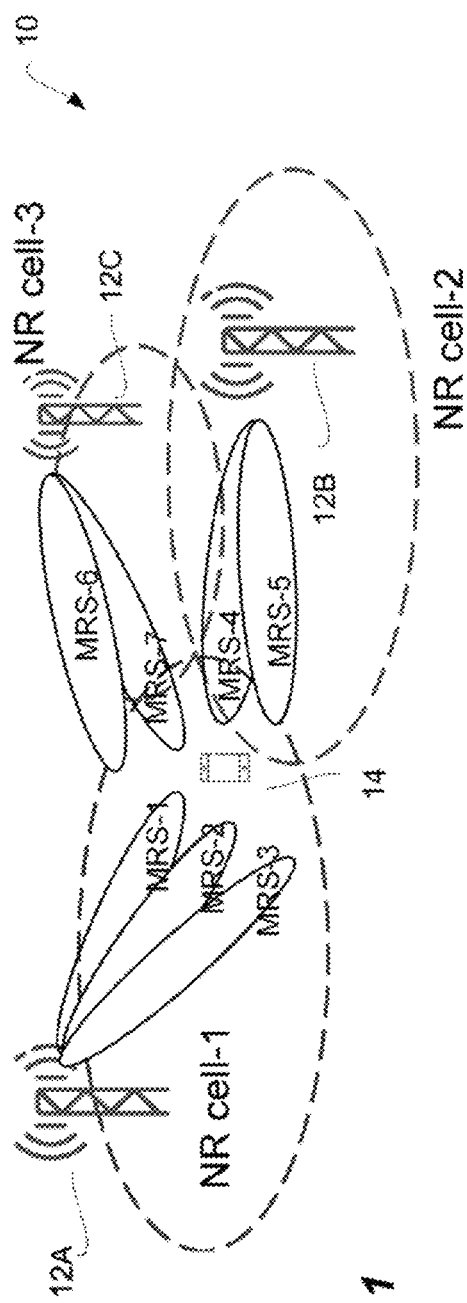
FIG. 1 is a schematic drawing of cells in a telecommunication system exploiting various MRS configurations according to embodiments of the invention.
Figure 2:
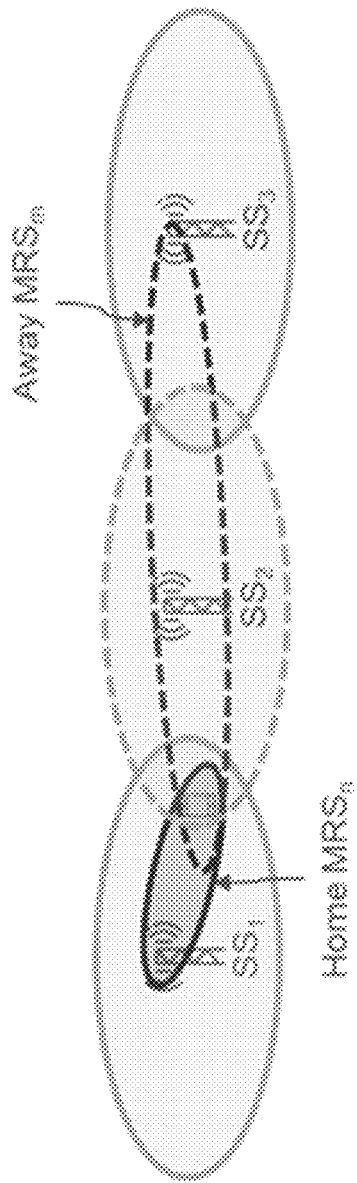
FIG. 2 is a schematic drawing of a wireless communication device (UE) subjected to signals from a cell that is not coordinated/recognized.

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein. The term circuit may be regarded as basically equivalent with the term module to describe an entity various combinations of hardware and software.

The solution presented herein is generally described in terms of reference signal (RS) transmission, link set identifier content, a current mobility status of a network configuration, and the configuration of the RS transmissions, e.g., to exclude/include/configure the link set identifier content. In general, the following describes the solution in terms of a mobility reference signal (MRS). It will be appreciated, however, that the solution presented herein applies to any RS used for mobility management. Further, the following describes the solution in terms of RS transmissions that each include a beam identifier (that identifies the beam carrying the RS), and whether the RS transmission should further include a cell ID, e.g., a local cell ID or global cell ID. As used herein, a local cell ID refers to a cell ID that is unique within a limited region of a network, where outside that region, there may be other cells assigned the same local cell ID, while a global cell ID refers to a cell ID that is unique within the entire network. It will be appreciated, however, that the cell ID is but one type of link set identifier content. Thus, the cell ID descriptions provided herein may more generally be expanded to include any link set identifier content, e.g. any content that identifies the source of the RS, that is provided with the RS in addition to the beam identifier. The following describes the solution in terms of mobility status, Automatic Neighbor Relation (ANR) status, Network (NW) reconfiguration status, etc. These various statuses represent a non-exhaustive list of variables that identify the current mobility status of a network configuration, particularly with respect to mobility management. Thus, while the following describes the determination of whether to include link set identifier content with an RS transmission responsive to the mobility status, ANR status, and/or NW reconfiguration status, it will be appreciated that this determination may more generally be made responsive to the current mobility status of the network configuration. Such a mobility status includes, but is not limited to the rate of ANR problems (MRS/cell ID conflicts and/or unknown MRS/cell IDs), the addition/removal/redirection of a network node from the pool of available network nodes, neighbor list updates, network reconfiguration information, etc. The solution presented herein also involves the configuration of the RS transmissions. This configuration comprises whether link set identifier content is needed with the RS transmission, as well as the type and/or length of the link set identifier content to include upon determining that such link set identifier content is needed. Further, while the network makes and applies the configuration decision of the solution presented herein, the solution presented herein may be implemented in a single network node, e.g., the serving node for a wireless communication device or an aggregation point in communication with the serving node and all potential target nodes, or the implementation may be distributed across multiple network nodes, e.g., implemented in a remote server, a virtualized network, or a cloud computing service.

Exemplary network nodes include, but are not limited to, the serving node serving a wireless communication device (UE), one or more target nodes, an aggregation point in communication with the serving and/or target nodes, e.g., using Radio Resource Control (RRC) or proprietary signaling, or any other network node in communication with the serving and/or target nodes. It will be appreciated that an aggregation point may be comprised in a base station, and when comprised within a base station, the aggregation point is capable or configurable to configure reference signal transmissions, and particularly to configure its own reference signal transmissions. As used herein, an "aggregation point" refers to a network entity that collects relevant information from multiple nodes, e.g., ANR status and encountered problems, makes decisions about the configurations of the RS/RS transmissions, and communications the configuration decisions to the nodes, e.g., the nodes impacted by the configuration decisions. Finally, the solution is presented herein as pertaining to RSs sent to a User Equipment (UE), but it will be appreciated that the solution presented herein applies to RSs sent to any wireless communication device, e.g. a cellphone, tablet, personal computer, or any other wireless communication device that moves around within a wireless network and receives signals via downlink channels. With this in mind, the following provides the details for the solution presented herein.

Main Principles

Many networks operate most of the time in a steady-state mode where the node deployment does not change and the established ANR relations are valid. In such stable situations, the subset anodes (and beams) that a UE can receive with sufficient quality will have been previously learned by the ANR, which information can be utilized for local MRS coordination. In such situations, cell ID information does not need to be provided together with beam-oriented MRS transmissions.

When propagation conditions or node deployments in the network are changed, a UE at a certain location may be able to receive beams that it previously could not hear. Those may come from nodes that are not present in the serving node's neighbor list and thus UE's measurement reports of them cannot be properly interpreted by the serving node. In such situations, the originating cell ID information may need to be associated with the MRSs. By using the cell ID info, the ANR system may update the relevant relations and return to steady-state operation.

Based on these realizations, the network operates in low-overhead, beam-ID based MRS mode when the conditions resemble steady-state, and in one or more higher-overhead modes when cell ID information is required to support mobility, ANR, and NW reconfiguration functions.

The NW aspect of the solution presented herein can be expressed using the following flow diagram:

50 Determine type of required cell ID information
    52 Select suitable MRS configuration
    54 Configure nodes to transmit the selected MRS configuration
    56 (Optional) Configure UEs to receive and report the selected MRS configurations
    58 Transmit configured MRS from nodes In 50, the type and extent of required cell ID information is determined. This may be done based on e.g. mobility status. ANR status or NW reconfiguration status, etc., i.e. in response to observing frequent ANR problems or when new nodes have been added to the NW or antenna setups reconfigured. Alternatively, it may be done periodically for an area—once every week, month, etc. In 52, a suitable MRS configuration is selected that can provide the required cell ID info. In 54, NW nodes are configured for selected MRS transmission and the allocation of MRS may be coordinated between nodes. The number of nodes involved in such coordination depends on the MRS format to be transmitted. The steps 50-54 may be performed by aggregation points in the NW to enable more efficient handling of the allocation/conflict resolution negotiation tasks. In 56 (optional), the serving nodes may configure their UEs to receive and report according to the selected MRS formats. In 58, MRS are transmitted using the selected MRS format.

Some of the individual steps are elaborated upon below.
The UE aspect can be summarized as follows:
- 60 Receive two or more MRS configurations with different cell ID content levels
- 62 Detect and report MRS measurement results according to configurations Two or more MRS formats must be defined and the UE must be capable of receiving, interpreting, and reporting according to the multiple formats.

Examples of Formats

The modes described above may in one embodiment be achieved by invoking two or more distinct MRS formats. Some examples of such formats are listed next.

Format 1: Only Beam ID

In the 3GPP Discussion Document R1-1611915 "On NR DL Mobility Measurement Signal Design", a design is described where MRS ID only identifies a beam—no static mapping to the originating PCI is present. "Beam" refers to highest required mobility resolution—it may refer to a narrow beam, but also entail a cell, sector TRP, etc. in some deployments. Allocation of MRS is coordinated dynamically within the local neighborhood within which the allocated MRS indices are unique.

The design is light-weight, conveying an index of e.g. approximately ~10 bits. The MRS ID may be built out of symbol sequence index and Time/Frequency (T/F) allocation index.

If beam grouping support within the local area is required, the total index may be partitioned into a node ID and beam ID sections. For example, four Most Significant Bits (MSBs) =node/cell, six Least Significant Bits (LSBs)=beam within the node. Partitioning may be flexible, depending on deployment. For example, for sub-6 GHz bands, a larger node ID space and a smaller beam ID space per beam may be used.

Figure 3:
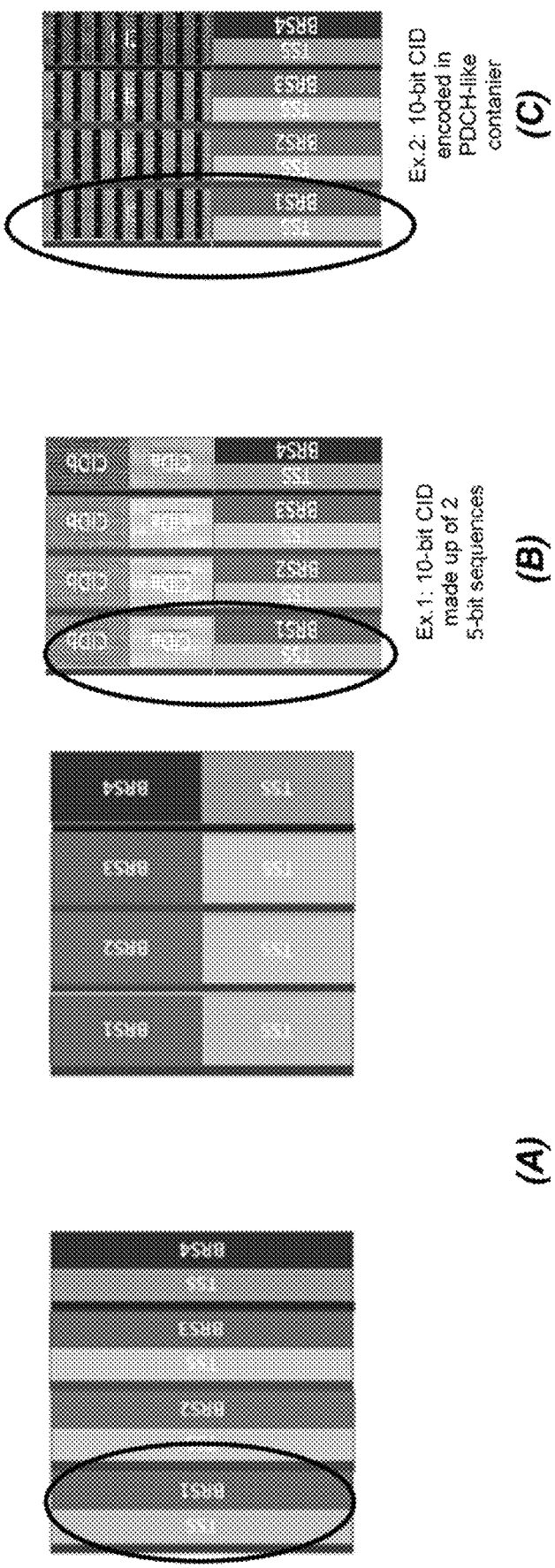
FIGS. 3A, 3B, and 3C are schematic diagrams of different MRS formats according to embodiments of the invention.

In the design shown in FIG. 3A, the MRS consists of a synch field (TSS), similar to the PSS in LTE to obtain initial T/F synchronization, and beam ID field (Beam Reference Signal (BRS)), similar to SSS in LTE. FIG. 3A shows a beam sweep with 4 beams where the each BRS carries a separate beam ID (1-4). The two fields may be multiplexed into a single OFDM symbol. The left half of FIG. 3A shows time-domain concatenation and the right half of FIG. 3A shows frequency-domain concatenation. Time-domain concatenation of is preferred since it maximizes the frequency diversity for both fields and allows the full MRS frequency span to be used for TSS-based timing estimation. Other designs are also possible.

In the format shown in FIG. 3A, the CID and MRS fields identify the cell and a beam within a cell. The load is increased but maybe is still manageable in many deployments. The total CID+MRS index field may require ~20 bits. The CID field may be added to MRS e.g., as an adjacent sequence-modulated or coded container R1-1611916 "Enabling Beam Grouping by UE in Mobility RS Measurements", but other deterministic CID resource mapping options in relation to MRS resources may also be used.

Format 2: Contains Local Cell ID (CID)

FIGS. 3B and 3C depict some ways of attaching the CID information to the baseline MRS signal. In the example (Ex1), shown in FIG. 3B, the CID may comprise 10 bits that are included in two 5-bit (length-32) sequence modulated fields whose resource allocation has a fixed relationship to the MRS resource allocation. In the example (Ex2), shown in FIG. 3C, the CID field is included as encoded data, e.g. encoded in a PDCH-like container, possibly together with Demodulation Reference Signal (DMRS) (black Resource Elements (REs)) for phase reference.

The CID size should be chosen so that the resulting cell ID coordination space keeps the probability of ANR conflicts sufficiently low. The CID space may differ from the PCI space. It will be appreciated that the dynamic configuration of the RS transmission disclosed herein may also include the dynamic selection/adjustment of the CID, PCI, etc., size. To that end, the CID size may be chosen such that the resulting cell ID coordination space keeps the probability of ANR conflicts sufficiently low. It will be appreciated that the option of having different sized link set identifier content may be implemented as part of different subformats within the format that includes the link set identifier.

Format 3: Contains Global Cell ID

Figure 4:
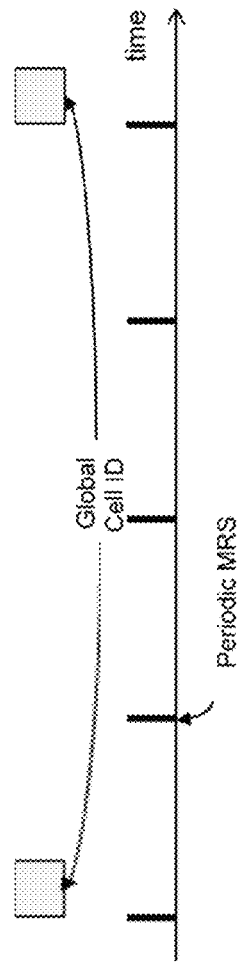
FIG. 4 is a schematic diagram of a container associated with an MRS transmission according to embodiments of the invention.

Here, global cell ID (unique in the network) is transmitted as a container associated with an MRS transmission, as shown in FIG. 4. This may be achieved e.g. as Physical Downlink Control Channel (PDCCH)/Physical Downlink Channel (PDCH) linked to Radio Network Temporary Identifier (RNTI) I based on MRS contents, or fixed PDCH resources in relation to the MRS resources.

Since the global ID consists of a large number of bits, it is in many cases not feasible to transmit (and report) it with every MRS subframe. Instead it may be sent every X ms (regardless of MRS period) or with every Y-th MRS. Alternatively, it may be provided on demand, as a single transmission.

In an alternative embodiment, the MRS modes are achieved by configuring a continuously or gradually adjustable MRS setup to provide the required extent of cell ID information.

The MRS setup may consist of multiple MRS formats as described above. For example, the NW may transmit Format 2 every $N^{th}$ MRS subframe and Format 1 all other MRS subframes. By adapting N, the desired trade-off of cell ID-related overhead and cell ID information availability may be achieved in a gradual manner.

As a variation of this embodiment, Format 2 may be invoked with a first period (N), and Format 3 may be invoked with a second period (M), the rest of the MRS subframes transmitting Format 1.

Adaptation Strategies

Switch from Format 1 to Format 2
- if the rate of ANR problems (MRS conflicts or unknown MRS) exceeds a threshold
- if a new node has been added
- periodically to verify established. ANR info in the NW, where the period may depend on the statistical rate of environment or deployment changes in the given network.

Switch from Format 2 to Format 3
- if the rate of ANR problems (cell ID conflicts or unknown cell ID) exceeds a threshold Switch from Format 2 or 3 to Format 1 if the rate of neighbor list updates drops below a threshold if the rate of ANR problems (cell ID conflicts or unknown cell ID) drops below a threshold for a predetermined time period Switch from Format 1 to Format 3 if major network reconfiguration has been performed, many nodes added or redirected within the entire network, etc.

Switch from Format 3 to Format 2

If the network detects that the majority of recent ANR updates resulting from reported global ID information could have equally well been accomplished using the more local cell ID information, i.e. the rate of ANR updates related to cells beyond the local cell ID group drops below a threshold, etc.

In implementations with continuously or gradually adjustable period of cell ID information provision (Format 2 or 3), the period may be chosen as a predetermined function of the rate of ANR problems during subframes receiving MRS format with lower cell D information content (Format 1 or Format 2 respectively).

ANR Conflict Handling

Occasional ANR problems will occur with Formats 1 and 2—UE reports unknown or duplicate beam or cell IDs from further-away cells that are not coordinated with the serving cell, or not present in its neighbor list.

Such conflicts may be resolved using mechanisms similar to PCI resolution.

Scales of Timing and Local Area

Switching between MRS modes may preferably take place at time scales of minutes to hours, but faster switching may also be relevant in some situations.

If a new node is added, in some embodiments only that node's transmitted MRS maybe configured to include cell ID information.

The local area for coordinating Format 1 MRS allocation may include tens to hundreds of nodes, but fewer than the PCI address space. These local areas must be assigned in an overlapping manner so that coordination is reasonably assured for any set of nodes from which a UE at any location in the network can detect mobility beams. The coordination may be deemed sufficient e.g., if the average rate of occurrence of beam ID conflicts or encountering unknown MRS is below a certain desired level, e.g., once per ten minutes.

To detect, measure, and report the multiple MRS formats or configurations, the UE is prepared to receive the different signal formats associated with the MRS formats.

In some embodiments, the UE is explicitly configured to receive a certain MRS format or configuration, including e.g. the period of CID inclusion in Format 2. In this case, the UE may receive the MRS format or configuration information any time before the receipt of an MRS, or any time after the receipt of the MRS. In some embodiments, the UE may receive the specific configuration information applied to the MRS with the MRS. In other embodiments, the UE blindly detects which format is transmitted. This may be done e.g. by first detecting the MRS field and then checking for the presence of CID or global ID fields at relevant resource locations. If no such fields are detected, the UE assumes that a format 1 MRS was transmitted.

Since the MRS configuration may differ in different areas of the network, a UE may simultaneously hear MRSs with different formats. The UE may be configured to report all results to the serving node according to a certain signaling configuration, or it may report each MRS using a signaling configuration associated with the particular MRS format.

Coordination of MRS allocation may be performed using prior art approaches, using, e.g. random allocation and correction when conflicts are detected, or explicit negotiation to avoid conflicts from the start.

Figure 7:
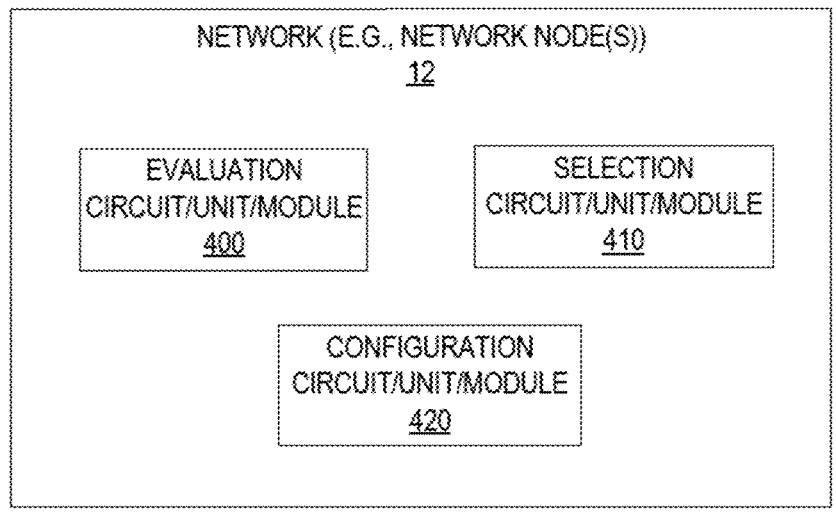
FIG. 7 is a block diagram for circuit elements associated with a network node according to embodiments of the invention.

FIG. 5 shows an exemplary method 100 for the solution presented herein as executed by one or more nodes 12 in the network 10. According to this exemplary method 100, the network node(s) configure reference signal transmission from one or more network nodes to a wireless communication device 14 to facilitate mobility measurement reporting by the wireless communication device 14. To facilitate this discussion, the components of one or more nodes shown in FIG. 7 are used to describe method 100. Accordingly, an evaluation circuit/module 600 determines whether there is a need to include link set identifier content with one or more of the reference signal transmissions responsive to network information regarding a current mobility status of a network configuration, where each of said reference signal transmissions originating from one of the one or more network nodes (block 110). A selection circuit/module 410 defines a configuration for each of the reference signal transmissions responsive to the determination (block 120), and a configuration circuit/module 620 configures the one or more network nodes to implement the reference signal transmissions according to the defined configurations (block 130). As shown in FIG. 7, the evaluation circuit/module 400, selection circuit module 410, and configuration circuit/module 420 may be located in one or more network nodes 12 within the network 10.

Figure 9:
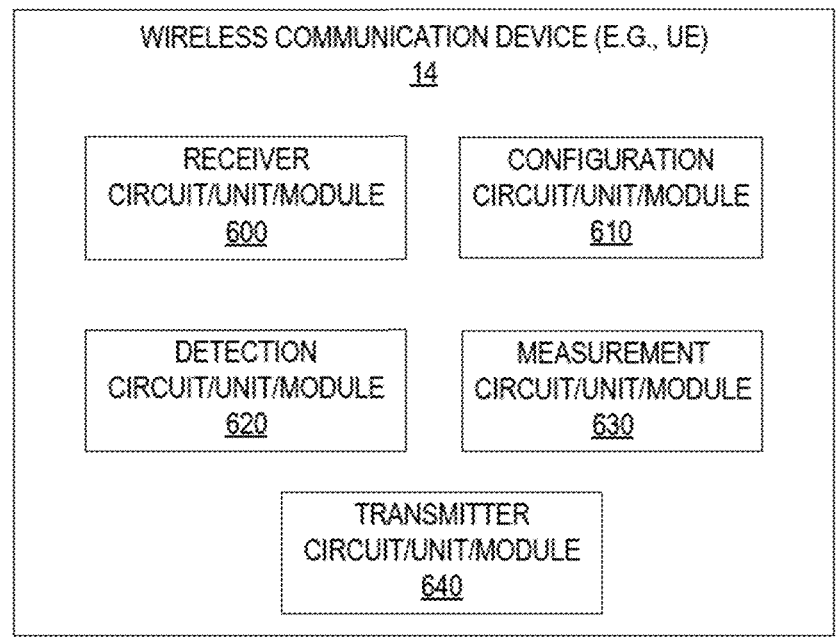
FIG. 9 is a block diagram for circuit elements associated with a wireless communication device according to embodiments of the invention.

FIG. 6 shows an exemplary method 200 for the solution presented herein as executed by the wireless communication device 14. According to this exemplary method 200, device 14 processes reference signals received by the device 14. To facilitate this discussion, the components of the wireless communication device shown in FIG. 9 are used to describe method 200. Accordingly, a receiver circuit/module 600 receives a plurality of reference signals from one or more network nodes 12 (block 210). A configuration circuit/module 610 determines one or more configurations of the received reference signals, where each of the configurations define whether link set identifier content is included with the received reference signals (block 2203. A detection circuit/module 620 detects the received reference signals responsive to the determined one or more configurations (block 230), and a measurement circuit/module 630 performs one or more measurements for each of the received reference signals using the corresponding detected reference signals (block 240), A transmitter circuit/module 640 reports the one or more measurements to a network node 12A serving the wireless communication device 14 (block 250).

The embodiments of FIGS. 7-10 include multiple circuits/modules for performing the steps of the corresponding methods. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

FIG. 7 shows a block diagram for the circuit elements associated with one or more nodes 12 for performing the method 100 of FIG. 5. As shown, node(s) 12 implement various functional means, units, circuits, or modules. These functional means, units, circuits, or modules include for example evaluation circuit/unit/module 400, a selection circuit/unit/module 410, and a transmitter circuit/unit/module 420 for performing the method 100 of FIG. 5.

Figure 8:
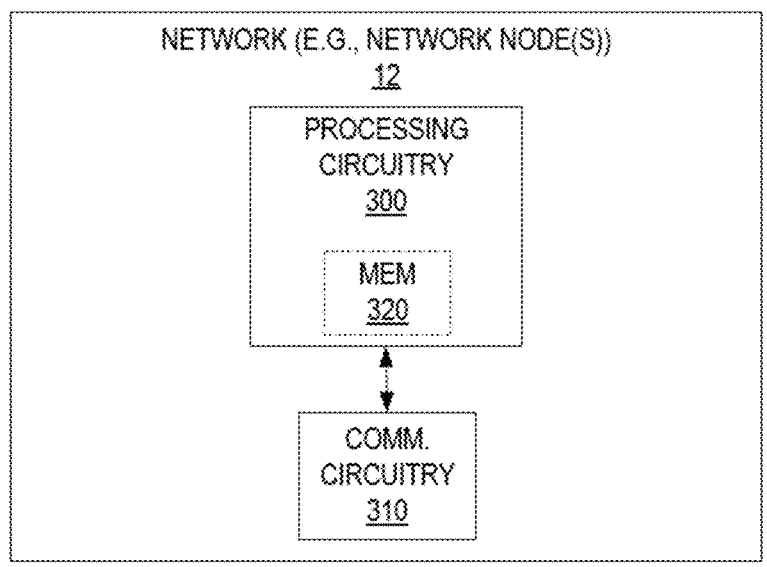
FIG. 8 is a block diagram for modules associated with a network node according to embodiment of the invention.

Those skilled in the art will also appreciate that embodiments herein further include corresponding computer programs. A computer program comprises instructions which, when executed on at least one processing circuit 300 of one or more nodes 12, cause the node(s) 12 to carry out any of the respective processing described above with respect to FIG. 5. A computer program in this regard may comprise one or more code modules corresponding to the means or units described above. To that end, the node(s) 12 comprise processing circuitry 200, communication circuitry 310, and memory 320, as shown in FIG. 8. Memory 320 stores the code to be executed by the processing circuitry 300 and/or communication circuitry 310 according to the method 100 of FIG. 5.

FIG. 9 shows a block diagram for the circuit elements associated with a wireless communication device 14 for performing the method 200 of FIG. 6. As shown, device 14 implements various functional means, units, circuits, or modules. These functional means, units, circuits, or modules include for example receiver circuit/unit/module 600, configuration circuit/unit/module 610, detection circuit/unit/module 620, measurement circuit/unit/module 630, and a transmitter circuit/unit/module 640 for performing the method 200 of FIG. 6.

Figure 10:
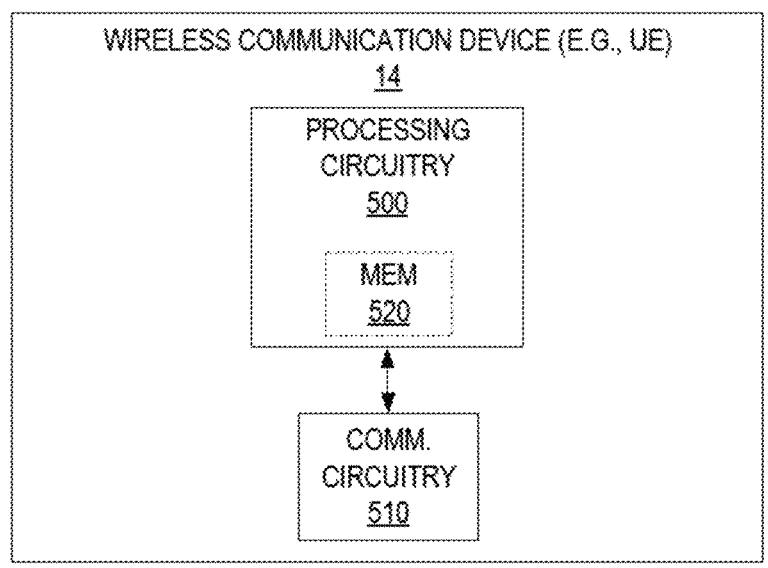
FIG. 10 is a block diagram for modules associated with a wireless communication device according to embodiments of the invention.

Those skilled in the art will also appreciate that embodiments herein further include corresponding computer programs. A computer program comprises instructions which, when executed on at least one processing circuit 500 of the wireless communication device 14, cause the device 14 to carry out any of the respective processing described above with respect to FIG. 6. A computer program in this regard may comprise one or more code modules corresponding to the means or units described above. To that end, the device comprises processing circuitry 500, communication circuitry 510, and memory 520, as shown in FIG. 10. Memory 520 stores the code to be executed by the processing circuitry 500 and/or communication circuitry 510 according to the method 200 of FIG. 6.

Embodiments further include a carrier containing a computer program (for either the network or device embodiments). This carrier may comprise one of an electronic signal, optical signal, radio signal, or computer readable storage medium. In this regard, embodiments herein also include a computer program product stored on a non-transitory computer readable (storage or recording) medium and comprising instructions that, when executed by a processor of the node(s) or wireless communication device, cause the node or device to perform as described above. Embodiments further include a computer program product comprising program code portions for performing the steps of any of the embodiments herein when the computer program product is executed by a computing device. This computer program product may be stored on a computer readable recording medium.

Reference has been made herein to various embodiments. However, a person skilled in the art would recognize numerous variations to the described embodiments that would still fall within the scope of the claims. For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Hence, it should be understood that the details of the described embodiments are merely examples brought forward for illustrative purposes, and that all variations that fall within the scope of the claims are intended to be embraced therein.

The invention claimed is:

1. A method implemented in a network node of configuring reference signal transmissions from one or more network nodes to a wireless communication device to facilitate mobility measurement reporting by the wireless communication device, the method comprising:
determining, responsive to network information regarding a current mobility status of a network configuration, whether there is a need to include link set identifier content with one or more of the reference signal transmissions, said link set identifier content comprising at least one of a local cell identifier information and a global cell identifier information, each of said one or more reference signal transmissions originating from one of the one or more network nodes;
defining a configuration for each of the one or more reference signal transmissions responsive to the determination; and
configuring the one or more network nodes to implement the one or more reference signal transmissions according to the defined one or more configurations.

2. The method of claim 1 wherein configuring the one or more network nodes comprises configuring the one or more network nodes by providing the corresponding configuration(s) to each of the one or more network nodes.

3. The method of claim 1 wherein defining the configuration comprises selecting one of a plurality of formats for each of the one or more reference signal transmissions responsive to the determination.

4. The method of claim 1 wherein defining the configuration comprises defining, for each of the one or more reference signal transmissions, a period controlling how often to include the link set identifier content with the corresponding reference signal transmission responsive to the determination.

5. The method of claim 1 further comprising selecting, for at least one of one or more network nodes, a controlling configuration from the configurations defined for the reference signal transmission associated with the corresponding network node, wherein configuring the one or more network nodes comprises configuring each network node according to the selected controlling configuration to implement each reference signal transmission associated with the corresponding network node according to the controlling configuration.

6. The method of claim 1 wherein the determining whether there is a need to include the link set identifier content with one or more of the reference signal transmissions comprises:

determining, responsive to the network information regarding a current mobility status of a network configuration, whether a new network node has been added;

when a new network node has been added, determining there is a need to include the link set identifier content with at least part of the one or more of the reference signal transmissions; and when a new network node has not been added, determining there is not a need to include the link set identifier content with one or more of the reference signal transmissions.

7. The method of claim 1 wherein the determining whether there is a need to include link set identifier content with one or more of the reference signal transmissions comprises:

counting a number of reference signal problems associated with the current mobility status of the network configuration;

comparing the number of reference signal problems to a reference threshold;

when the number of reference signal problems exceeds the reference threshold, determining there is a need to include the link set identifier content with at least part of the one or more of the reference signal transmissions; and when the number of reference signal problems does not exceed the reference threshold, determining there is not a need to include the link set identifier content with one or more of the reference signal transmissions.

8. The method of claim 1 the determining whether there is a need to include link set identifier content with one or more of the reference signal transmissions comprises:

counting a number of neighbor list updates associated with the current mobility status of the network configuration;

comparing the number of neighbor list updates to a list threshold;

when the number of neighbor list updates exceeds the list threshold, determining there is a need to include the link set identifier content with at least part of the one or more of the reference signal transmissions; and when the number of neighbor list updates does not exceed the list threshold, determining there is not a need to include the link set identifier content with one or more of the reference signal transmissions.

9. The method of claim 1 wherein the determining whether there is a need to include link set identifier content with one or more of the reference signal transmissions comprises:

periodically reviewing an automatic neighbor relation status associated with the current mobility status of the network configuration to determine if there are any changes to the automatic neighbor relation status;

when there are changes to the automatic neighbor relation status, determining there is a need to include the link set identifier content with at least part of the one or more of the reference signal transmissions; and when there are not changes to the automatic neighbor relation status, determining there is not a need to include the link set identifier content with one or more of the reference signal transmissions.

10. A network node in a wireless communication network adapted to configure reference signal transmissions to a wireless communication device to facilitate mobility measurement reporting by the wireless communication device, the network node comprising:

an evaluation circuit adapted to determine, responsive to network information regarding a current mobility status of a network configuration, whether there is a need to include link set identifier content with one or more reference signal transmissions, said link set identifier content comprising at least one of a local cell identifier information and a global cell identifier information, each of said one or more reference signal transmissions originating from one of the one or more network nodes;

a selection circuit adapted to define a configuration for each of the one or more reference signal transmissions responsive to the determination; and a configuration circuit adapted to configure the one or more network nodes to implement the one or more reference signal transmissions according to the defined configurations.

11. The node of claim 10 wherein:

the network node includes an aggregation point comprising the evaluation, selection, and configuration circuits; and the configuration circuit configures one or more network nodes by providing the corresponding configuration(s) to each of the one or more network nodes.

12. The node of claim 10 wherein the selection circuit is adapted to define the configuration by selecting one of a plurality of formats for each of the one or more reference signal transmissions responsive to the determination.

13. The node of claim 10 wherein the selection circuit is adapted to define the configuration by defining, for each reference signal transmission, a period controlling how often to include the link set identifier content with the corresponding reference signal transmission responsive to the determination.

14. The node of claim 10 wherein the selection circuit is further adapted to select, for at least one of one or more network nodes, a controlling configuration from the configurations defined for the reference signal transmissions associated with the corresponding network node, wherein the selection circuit is adapted to configure one or more network nodes by configuring each network node according to the selected controlling configuration to implement each reference signal transmission associated with the corresponding network node according to the controlling configuration.

15. The node of claim 10 wherein the evaluation circuit is adapted to determine whether there is a need to include the link set identifier content with one or more of the reference signal transmissions by:

determining, responsive to network information regarding a current mobility status of a network configuration, whether a new network node has been added;

when a new network node has been added, determining there is a need to include the link set identifier content with at least part of the one or more of the reference signal transmissions; and when a new network node has not been added, determining there is not a need to include the link set identifier content with one or more of the reference signal transmissions.

16. The node of claim 10 wherein the evaluation circuit is adapted to determine whether there is a need to include link set identifier content with one or more of the reference signal transmissions by:

counting a number of reference signal problems associated with the current mobility status of the network configuration;

comparing the number of reference signal problems to a reference threshold;
when the number of reference signal problems exceeds the reference threshold, determining there is a need to include the link set identifier content with at least part of the one or more of the reference signal transmissions; and
when the number of reference signal problems does not exceed the reference threshold, determining there is not a need to include the link set identifier content with one or more of the reference signal transmissions.

17. The node of claim 10 wherein the evaluation circuit is adapted to determine whether there is a need to include link set identifier content with one or more of the reference signal transmissions by:
counting a number of neighbor list updates associated with the current mobility status of the network configuration;
comparing the number of neighbor list updates to a list threshold;
when the number of neighbor list updates exceeds the list threshold, determining there is a need to include the link set identifier content with at least part of the one or more of the reference signal transmissions; and
when the number of neighbor list updates does not exceed the list threshold, determining there is not a need to include the link set identifier content with one or more of the reference signal transmissions.

18. The node of claim 10 wherein the evaluation circuit is adapted to determine whether there is a need to include link set identifier content with one or more of the reference signal transmissions by:
periodically reviewing an automatic neighbor relation status associated with the current mobility status of the network configuration to determine if there are any changes to the automatic neighbor relation status;
when there are changes to the automatic neighbor relation status, determining there is a need to include the link set identifier content with at least part of the one or more of the reference signal transmissions; and
when there are not changes to the automatic neighbor relation status, determining there is not a need to include the link set identifier content with one or more of the reference signal transmissions.

19. A method of processing reference signals implemented in a wireless communication device, the method comprising:
receiving a plurality of reference signals from one or more network nodes at the wireless communication device;
determining one or more configurations of the received plurality of reference signals, each of said configurations defining whether link set identifier content is included with the received plurality of reference signals, said link set identifier content comprising at least one of a local cell identifier information and a global cell identifier information;
detecting the received plurality of reference signals responsive to the determined one or more configurations;
performing one or more measurements for each of the received plurality of reference signals using the corresponding detected reference signals; and
reporting the one or more measurements from the wireless communication device to a network node serving the wireless communication device.

20. The method of claim 19 wherein determining the configuration of the received reference signals comprises blindly determining the configuration of the received plurality of reference signals by:
evaluating one or more predetermined locations within each of the plurality of reference signals to determine whether link set identifier content is present in one or more of the received plurality of reference signals; and
determining the configuration for each received plurality of reference signals responsive to the evaluation.

21. The method of claim 19 further comprising configuring the wireless communication device according to one or more predetermined configurations defined for the plurality of reference signals, wherein determining the configuration of the received plurality of reference signals comprises determining which of the one or more predetermined configurations applies to each received reference signal.

22. A wireless communication device adapted to process reference signals comprising:
a receiver adapted to receive a plurality of reference signals from one or more network nodes at the wireless communication device;
a configuration circuit adapted to determine one or more configurations of the received plurality of reference signals, each of said configurations defining whether link set identifier content is included with the received plurality of reference signals, said link set identifier content comprising at least one of a local cell identifier information and a global cell identifier information;
a detection circuit adapted to detect the received plurality of reference signals responsive to the determined one or more configurations;
a measurement circuit adapted to perform one or more measurements for each of the received plurality of reference signals using the corresponding detected reference signals; and
a transmitter adapted to report the one or more measurements to a network node serving the wireless communication device.

23. The wireless communication device of claim 22 wherein the configuration circuit is adapted to determine the configuration of the received plurality of reference signals by blindly determining the configuration of the received plurality of reference signals by:
evaluating one or more predetermined locations within each of the plurality of reference signals to determine whether link set identifier content is present in one or more of the received plurality of reference signals; and
determining the configuration for each received reference signal responsive to the evaluation.

24. The wireless communication device of claim 22 wherein the configuration circuit is further adapted configure the wireless communication device according to one or more predetermined configurations defined for the plurality of reference signals, wherein the configuration circuit is adapted to determine the configuration of the received plurality of reference signals by determining which of the one or more predetermined configurations applies to each received reference signal.

25. A non-transitory computer readable medium storing a computer program comprising software instructions which, when run on one or more processing circuits in a network node, causes the node to:
determine, responsive to network information regarding a current mobility status of a network configuration, whether there is a need to include link set identifier content with one or more of the reference signal transmissions, said link set identifier content comprising at least one of a local cell identifier information and a global cell identifier information, each of said one or more reference signal transmissions originating from one of the one or more network nodes;

define a configuration for each of the one or more reference signal transmissions responsive to the determination; and configure the one or more network nodes to implement the one or more reference signal transmissions according to the defined one or more configurations.

26. A non-transitory computer readable medium storing a computer program comprising software instructions which, when run on one or more processing circuits in a wireless communication device, causes the wireless communication device to:

receive a plurality of reference signals from one or more network nodes at the wireless communication device;

determine one or more configurations of the received plurality of reference signals, each of said configurations defining whether link set identifier content is included with the received plurality of reference signals, said link set identifier content comprising at least one of a local cell identifier information and a global cell identifier information;

detect the received plurality of reference signals responsive to the determined one or more configurations;

perform one or more measurements for each of the received plurality of reference signals using the corresponding detected reference signals; and report the one or more measurements from the wireless communication device to a network node serving the wireless communication device.

\* \* \* \* \*